US012600105B2

(12) United States Patent
Lanzrath et al.

(10) Patent No.: US 12,600,105 B2
(45) Date of Patent: Apr. 14, 2026

(54) HEAT PRESS DUAL-ZONE TEMPERATURE CONTROL SYSTEM

(71) Applicant: Lowtemp Industries LLC, Arvada, CO (US)

(72) Inventors: Levi Garrett Lanzrath, Lakewood, CO (US); Ryan Sparks, Arvada, CO (US)

(73) Assignee: Lowtemp Industries LLC, Arvada, CO (US)

( * ) Notice: Subject to any disclaimer, the term of this patent is extended or adjusted under 35 U.S.C. 154(b) by 223 days.

(21) Appl. No.: 18/412,491

(22) Filed: Jan. 13, 2024

(65) Prior Publication Data

US 2024/0239076 A1 Jul. 18, 2024

Related U.S. Application Data

(60) Provisional application No. 63/479,891, filed on Jan. 13, 2023.

(51) Int. Cl.

*B30B 15/06* (2006.01)
*B30B 15/16* (2006.01)
*B30B 15/26* (2006.01)
*B30B 15/28* (2006.01)

(52) U.S. Cl.

CPC .......... *B30B 15/166* (2013.01); *B30B 15/064* (2013.01); *B30B 15/26* (2013.01); *B30B 15/28* (2013.01)

(58) Field of Classification Search

CPC ..... B30B 15/166; B30B 15/064; B30B 15/26; B30B 15/34; B30B 15/28; B30B 9/047; B41F 33/0009; B41F 16/002

See application file for complete search history.

(56) References Cited

U.S. PATENT DOCUMENTS

| | | | | |
|---|---|---|---|---|
| 7,963,219 | B2 * | 6/2011 | Robinson | B41F 33/0072 156/583.1 |
| 11,554,565 | B2 * | 1/2023 | Kralis | B30B 15/26 |
| 2018/0361730 | A1 * | 12/2018 | Robinson | B41F 16/02 |
| 2019/0263079 | A1 * | 8/2019 | Britton | B30B 9/047 |
| 2022/0040947 | A1 * | 2/2022 | Mombourquette | B30B 15/064 |

* cited by examiner

*Primary Examiner* — Jimmy T Nguyen

(74) *Attorney, Agent, or Firm* — Avek IP, LLC; Marshall Honeyman

(57) ABSTRACT

A heat press dual-zone temperature control system includes a first plate including an internal heating element and a first temperature sensor and a second plate including an internal heating element and a second temperature sensor. The first plate is arranged adjacent and parallel with the second plate. A controller is configured to provide temperature control, including controlling a temperature of the first plate to a first setpoint based on information from the first temperature sensor, and independently controlling a temperature of the second plate to a second setpoint based on information from the second temperature sensor. A user interface is communicatively coupled with the controller. The user interface includes a first zone configured to receive user input for the first plate and to display information about the first plate, and a second zone configured to receive user input for the second plate and to display information about the second plate.

20 Claims, 5 Drawing Sheets

HEAT PRESS DUAL-ZONE TEMPERATURE CONTROL SYSTEM

CROSS-REFERENCE TO RELATED APPLICATIONS

This application claims the benefit of U.S. Provisional Application No. 63/479,891 entitled "Heat Press Dual Zone Heat Controller with Pressure Sensor" and filed on Jan. 13, 2023, which is herein incorporated by reference in its entirety.

BACKGROUND OF THE INVENTION

The disclosed embodiments relate generally to the field of temperature control devices. More specifically, embodiments relate to an automated dual-zone heat controller and pressure monitor for a temperature-controlled rosin press.

Solvent-less extraction of plant rosin is often performed with a rosin press in which plant material is squeezed between plates. Controlling temperature of the plates may be desired to assist the extraction process.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a heat press dual-zone temperature control system includes: a first plate including an internal heating element and a first temperature sensor; a second plate including an internal heating element and a second temperature sensor, wherein the first plate is arranged adjacent and parallel with the second plate; a controller configured to provide temperature control, including: controlling a temperature of the first plate to a first setpoint based on information from the first temperature sensor; and independently controlling a temperature of the second plate to a second setpoint based on information from the second temperature sensor; and a user interface communicatively coupled with the controller, the user interface including: a first zone configured to receive user input for the first plate and to display information about the first plate; and a second zone configured to receive user input for the second plate and to display information about the second plate.

In another embodiment, a method of operating a dual-zone temperature controller for a heat press includes: selecting, via a user interface, a first desired temperature for a first plate having an internal heating element and a first temperature sensor; selecting, via the user interface, a second desired temperature for a second plate having an internal heating element and a second temperature sensor, wherein the first plate is arranged adjacent and parallel with the second plate; initiating heating of the first plate and the second plate via the user interface; controlling a temperature of the first plate to the first desired temperature via a controller based on information received from the first temperature sensor; independently controlling the temperature of the second plate to the second desired temperature via the controller based on information received from the second temperature sensor; displaying the first desired temperature and an actual temperature of the first plate on the user interface; and displaying the second desired temperature and an actual temperature of the second plate on the user interface.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
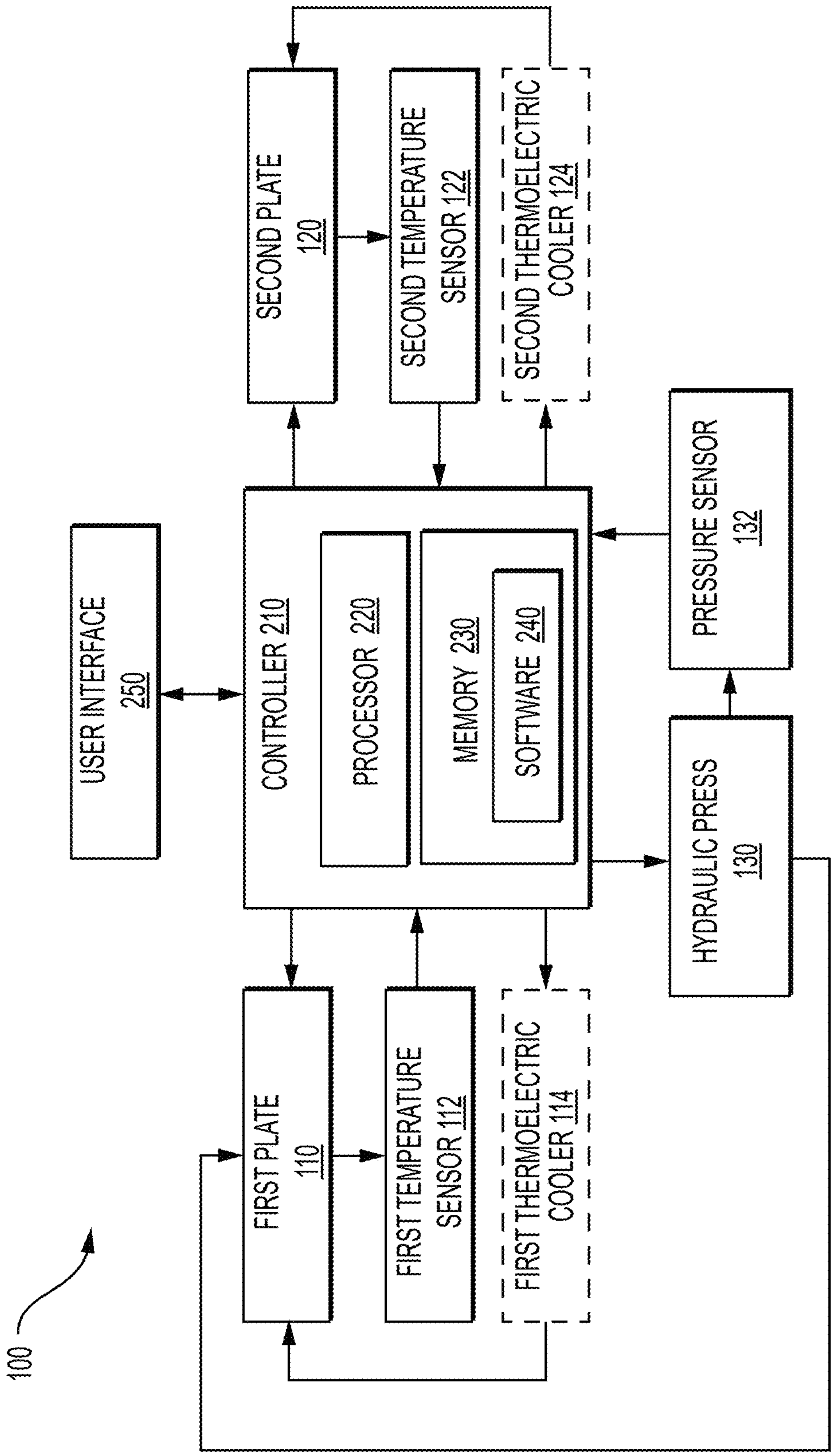
FIG. 1 is a block diagram showing components of a heat press dual-zone temperature control system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments disclosed herein include a rosin press having a heat controller configured for independently controlling two plates of the press, and a user interface configured for receiving user instructions and displaying temperature data. A pressure transducer is configured for providing pressure data from a hydraulic press to the user interface.

FIG. 1 is a block diagram showing components of an exemplary dual-zone temperature control system 100 for a heat press (e.g., a rosin heat press). System 100 comprises a first plate 110, a second plate 120, a hydraulic press 130, a controller 210, and a user interface 250. First and second plates 110, 120 are configured for pressing plant material therebetween to extract rosin from the plant material. In other words, the plates are arranged adjacent and parallel to one another. For example, first plate 110 is a top plate and second plate 120 is a bottom plate (or vice-versa), where the plant material is configured for placement between the first and second plates 110, 120. The plates 110, 120 may be made of a sturdy material such as an aluminum alloy (e.g., Billet Aircraft Grade 6061-T6 Aluminum) and machined flat.

Movement of one or both plates 110, 120 enables a gap between the plates to be increased/decreased such that plant material can placed between the plates then pressed by the plates. For example, a hydraulic press may be disposed on an outer side of a first plate 110 and configured with a piston for pressing the first plate 110 towards the second plate, thereby squeezing any plant material placed between the first and second plates 110, 120. Guides (not shown) may be used to guide movement of the plates with respect to one another, and springs (not shown) may be used to separate the plates 110, 120 from one another when the hydraulic press piston is withdrawn. The springs are configured to compress under a predetermined amount of force enabling the plates to be squeezed together by the piston. When the piston is released, first plate 110 is pushed away from second plate 120 via the springs (or vice-versa) and the plant material may be removed.

Each of the first and second plates 110, 120 may be configured for heating. For example, each plate may comprise an internal heating element configured for heating the plate such as a resistive heating element or a cartridge heating element. Heat is transferred to plant material placed between the first and second plates 110, 120 when the heating elements of the first and second plates 110, 120 are activated. Alternatively, first and second plates 110, 120 may comprise one or more thermoelectric coolers (TECs) that operate according to the Peltier effect, whereby electrical current flows through two electrical junctions such that heat is transferred therebetween, cooling one junction and heating the other. As shown in FIG. 1, a first TEC 114 may provide heat to first plate 110 under control of controller 210, and a second TEC 124 may provide heat to second plate 120 under control of controller 210. With the use of TECs, an inner side of the first and second plates 110, 120 that face one another are configured for heating to enable efficient heat transfer to plant material placed between the two plates.

Each of the first and second plates 110, 120 may comprise a temperature sensor. For example, as depicted in the FIG. 1 embodiment, a first temperature sensor 112 is coupled to first plate 110 and a second temperature sensor 122 is coupled to second plate 120. In embodiments, temperature sensors 112, 122 are coupled to plates 110, 120 via threaded couplings. First and second temperature sensors 112, 122 may each be a thermocouple (e.g., a K-type thermocouple) or a resistive thermal type of device such as a resistive temperature detector (RTD). First and second temperature sensors 112, 122 are communicatively coupled with controller 210 for providing a signal indicative of temperature.

For example, first and second temperature sensors 112, 122 may be wired sensors configured to plug into a first port and a second port, respectively, accessible from the exterior of system 100.

Hydraulic press 130 may comprise a hydraulic cylinder containing hydraulic fluid. In embodiments, hydraulic press 130 may comprise a 20-ton cylinder. A pressure sensor 132 may be provided for measuring an internal pressure of hydraulic press 130. Pressure sensor 132 is for example a pressure transducer (e.g., a 0 to 3.3V analog pressure transducer) configured to provide an analog signal indicative of an amount of pressure in a piston of the hydraulic press 130. Pressure sensor 132 is configured to provide the analog signal to the controller 210 for determining an amount of pressure. Optionally, pressure sensor 132 may be a wired sensor configured to plug into a third port accessible from the exterior of system 100.

Figure 2A:
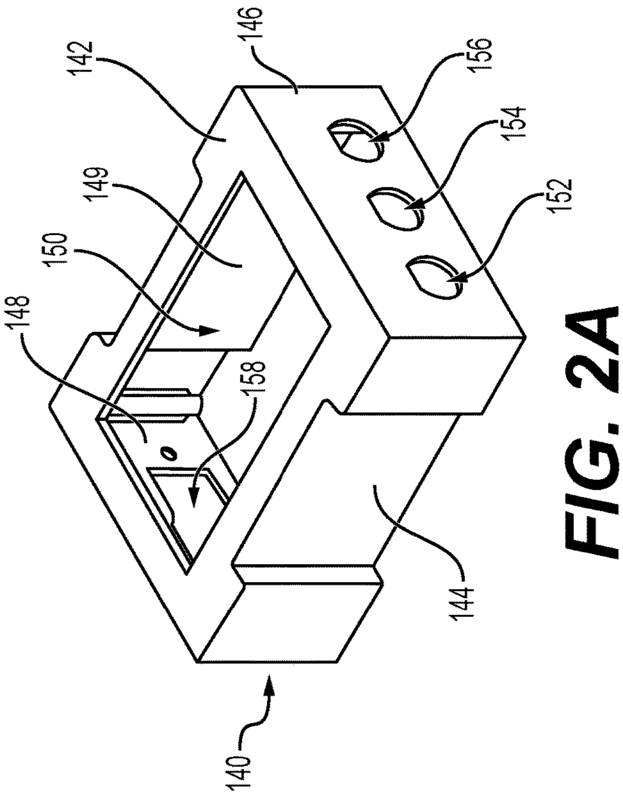
FIG. 2A is a perspective view showing an outside of a top enclosure for use with the system of FIG. 1, in an embodiment.
Figure 2B:
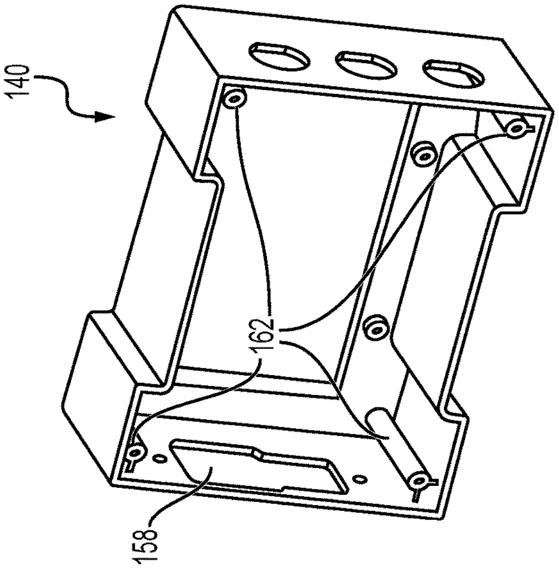
FIG. 2B is a perspective view showing an underside of the top enclosure of FIG. 2A.
Figure 2C:
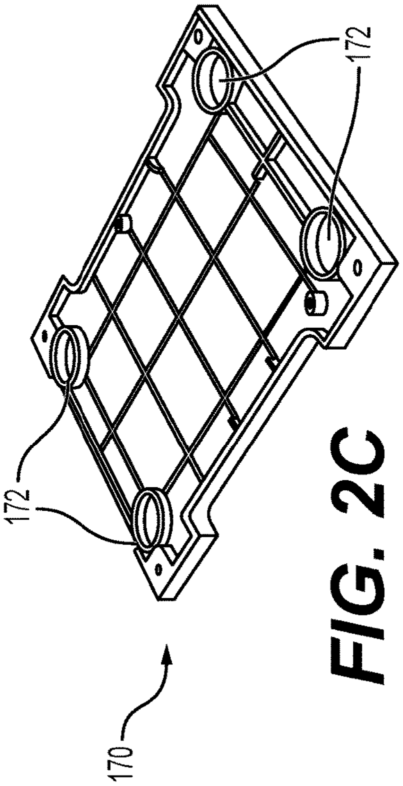
FIG. 2C is a perspective view showing a bottom enclosure configured for mating with the top enclosure of FIG. 2A, in an embodiment.

FIGS. 2A, 2B, and 2C show an exemplary enclosure for enclosing controller 210 and user interface 250. A top enclosure 140 comprises front and rear sides, left and right sides, and a top side. FIG. 2A is a perspective view showing an outside of top enclosure 140 with a top side 142, a front side 144, a right side 146, a left side 148, and a rear side 149 viewable. FIG. 2B is a perspective view showing an underside of top enclosure 140. FIG. 2C is a perspective view showing a bottom enclosure 170, which is configured for mating with the top enclosure. Top enclosure 140 and bottom enclosure 170 may be mechanically coupled together via fasteners (e.g., fitments, screws, bolts, rivets, etc.), welding, bonding, press fit, adhesives, or any other suitable means. For example, in the embodiment depicted in the drawings, stands 162 within the underside of top enclosure 140 are configured to align with receptacles 172 on the upper side of bottom enclosure 170. Stands 162 may be configured with threaded bolts and receptacles 172 may be configured with threads to accept the threaded bolts. Top enclosure 140 and bottom enclosure 170 may be made of plastic materials via 3D-printing or injection molding, for example.

Referring to FIG. 2A, top side 142 includes an opening 150 configured for viewing user interface 250 therethrough. Opening 150 may remain open or configured to receive a window (e.g., a optically transparent shield made of glass or plastic). Right side 146 includes a plurality of holes configured for accessing sensor ports. For example, a first hole 152 may be configured with a first port for plugging in first temperature sensor 112, a second hole 154 may be configured with a second port for plugging in second temperature sensor 122, and a third hole 156 may be configured for plugging in pressure sensor 132 (see FIG. 3B and its description below). Top enclosure 140 may further include a cutout 158 on left side 148. The cutout 158 may provide access to electronics of system 100, including but not limited to a physical power switch and an AC electrical plug receptacle (see e.g., FIG. 5B).

Returning to FIG. 1, controller 210 is for example a computer, microcontroller, microprocessor, or programmable logic controller (PLC) having a memory 230, including a non-transitory medium for storing software 240, and a processor 220 for executing instructions of software 240. Memory 230 may be used to store information used by controller 210, including but not limited to instructions, algorithms, lookup tables, etc. An example of software instructions includes a control algorithm, such as a proportional-integral-derivative (PID) control algorithm for providing closed-loop feedback control. In certain embodiments, some, or all of software 240 is configured as firmware for providing low-level control of the components of the system. Controller 210 is not limited by the materials from which it is formed or the processing mechanisms employed therein and, as such, may be implemented via semiconductor (s) and/or transistors (e.g., electronic integrated circuits (ICs)), and so forth.

A user interface 250 is communicatively coupled with the controller for receiving inputs from a user and displaying information to the user. Communication between controller 210 and other components of system 100 may be by one of a wired and/or wireless communication media. In embodiments, user interface 250 comprises two zones (see FIG. 3A) displayed on a display, such as a liquid-crystal display (LCD), organic light-emitting diode (OLED) display or similar type of electronic display. In some embodiments, user interface 250 is a touchscreen display configured for receiving touch inputs by a user.

Figure 3A:
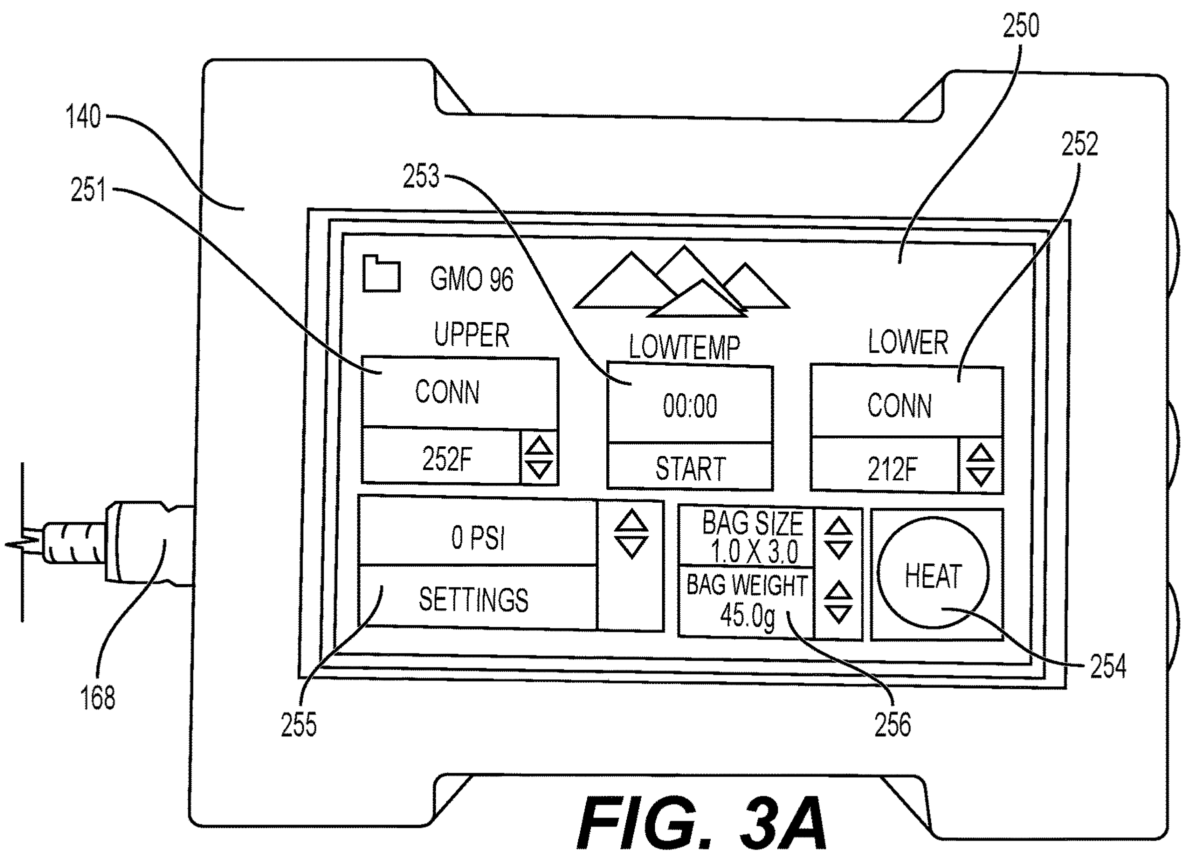
FIG. 3A shows a front view of the top enclosure and a user interface, in an embodiment.
Figure 3B:
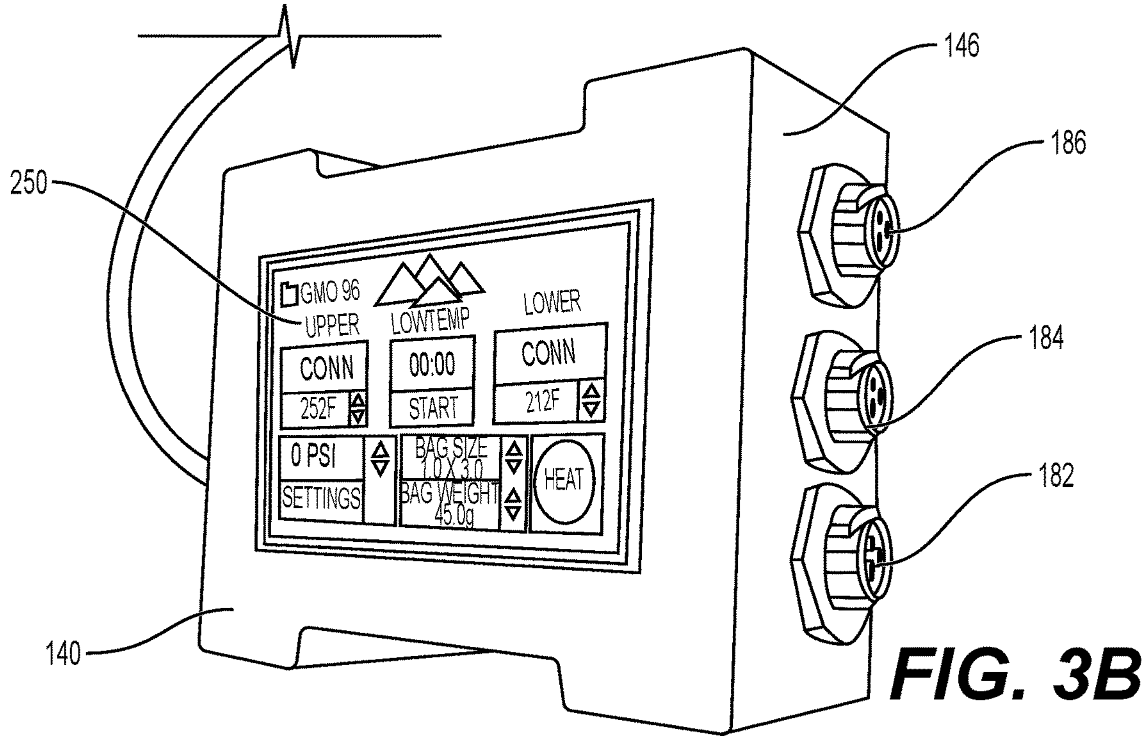
FIG. 3B shows a side perspective view of the top enclosure with wiring connection ports, in an embodiment.
Figure 4:
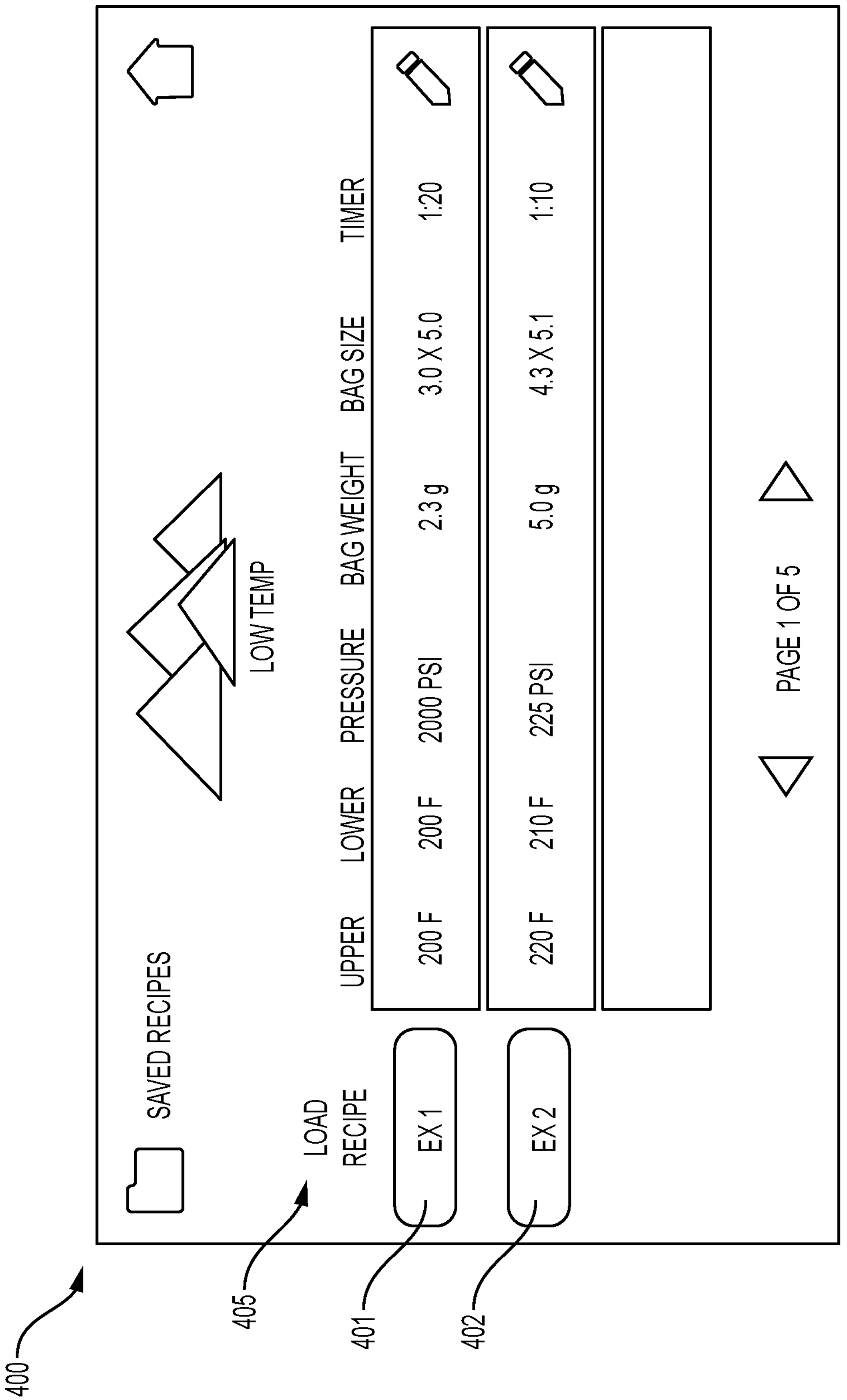
FIG. 4 shows a recipes menu of the user interface, in an embodiment.

FIGS. 3A, 3B, and 4 show dual-zone temperature control system 100. Specifically, FIG. 3A shows a front view of top enclosure 140 and user interface 250. In the FIG. 3A view, interface 250 displays two zones for displaying temperature information and receiving temperature setpoint inputs. Specifically, a first zone 251 displays temperature information and receives touch inputs for first plate 110; a second zone 252 displays temperature information and receives touch inputs for second plate 120.

FIG. 3B shows a side perspective view of right side 146 with wiring connection ports 182, 184, 186. For example, a first port 182 may be configured for plugging in first temperature sensor 112, a second port 184 may be configured for plugging in second temperature sensor 122, and a third port 186 may be configured for plugging in pressure sensor 132.

A temperature control display may be provided on user interface 250 for displaying temperature information of first plate 110 and second plate 120. In some embodiments, the temperature control display includes two zones each configured for controlling temperature and displaying temperature information for a respective one of the first and second plates 110, 120. For example, the temperature control display may include a first zone corresponding with first plate 110 displayed separately from a second zone corresponding with second plate 120. The first zone may be on a left side of the display while the second zone is on a right side of the display; alternatively, the first zone may be in a top portion of the display while the second portion is on a bottom portion of the display.

In an embodiment, each zone has an independently selectable temperature, with the 'upper' zone being on the left and the 'lower' zone being on the right. Each zone displays the actual calibrated temperature in the selected units of the plate on top, and the zone setpoint temperature on the bottom. Clicking either of the zones enables a user to enter a new setpoint for the zone via the keypad. If the displayed temperature of the zone does not match the actual temperature as measured by an external device (e.g., an infrared temperature gun or an external thermocouple), the calibrated temperature may be adjusted through settings.

In operation, a user sets a desired temperature on one or both zones and presses a "HEAT" button 254 to initiate heating. For example, user interface 250 includes a home screen having a "HEAT" button 254 as depicted in FIG. 3A. The "HEAT" button 254 enables heating of first plate 110 and/or second plate 120 based on the zone selected. Control of heat at the plates 110, 120 may be performed independently by controller 210 corresponding to selection of one or both zones. Once each zone displayed on user interface 250 has received an input for a desired temperature setpoint, that zone is maintained at the temperature setpoint continually.

In operation, controller 210 controls the temperature of each of first and second plates 110, 120 by executing via processor 220 instructions of software 240 stored in memory 230. The software instructions may include a temperature control algorithm, such as a closed-loop feedback control algorithm. In embodiments, the closed-loop feedback control algorithm comprises a proportional-integral-derivative (PID) control algorithm with adjustable gains for each of the proportional (P), integral (I), and derivative (D) terms. For example, the PID control loop may determine a temperature error, which is a difference between the desired setpoint temperature and an actual measured temperature.

In embodiments, when the measured temperature falls below the setpoint temperature by a predetermined amount (e.g., 0.5° C.), controller 210 instructs the corresponding heater to turn on until the temperature error is less than the predetermined amount; when the temperature rises above the setpoint by the temperature error, controller 210 instructs the heater to turn off to allow for passive cooling of the plates 110, 120. In some embodiments, system 100 is configured for heating and actively cooling such that controller 210 instructs the heating/cooling device (e.g., TECS 114, 124) to actively cool the plates 110, 120 until the temperature error is less than the predetermined amount.

When system 100 is in heating mode, it will also monitor for several safety faults and stop the heating process if a fault is detected. If firmware stops working during the heating cycle, system 100 has a built-in hardware watchdog that will automatically power down the heaters. In embodiments, the hardware watchdog is a MAX6705SKA watchdog from Maxim Integrated, which comprises a low-voltage, microprocessor supervisor with power-fail in/out, manual reset, and a watchdog timer. The hardware watchdog may be configured to disable the heating circuitry in the event of a software failure or delay. For example, if the heating elements are turned on to provide heat but a rise in temperature is not detected via temperature sensors 112, 122 within a predetermined duration, the hardware watchdog will turn off the heaters.

A timer 253 may be displayed on the user interface, which enables the user to track time while using system 100 based on input from either the user or the pressure sensor. The user may also select whether timer 253 counts up or down, which is a selectable feature in the user interface settings. Timer 253 includes a start button configured for receiving touch input and to start timer 253. Once timer 253 has started, the button is replaced with a stop button for stopping timer 253.

The displayed time on the home screen provides a selectable feature that enables a user to touch the displayed time. Once selected, a new desired time may be entered. In embodiments, editing the desired time stops timer 253 if in use. To begin timer 253 manually, the user may tap the "START" button. Once running, timer 253 will display a "STOP" button which the user may tap to stop timer 253. After the time has expired, the user interface displays a warning screen to indicate to the user that timer 253 has elapsed.

Timer 253 may also automatically start and stop based on the pressure. The pressure is simultaneously displayed on the screen. Timer 253 begins when the pressure exceeds a user-selectable pressure threshold and stops when the pressure decreases by a predetermined amount (e.g., at least 300-psi beneath the user-selected pressure threshold).

System 100 offers two modes of displaying pressure via user interface 250 and calculating pressure for timer functionality. The two modes may be changed by tapping on the pressure display on the home screen. In embodiments, a pressure value does not display on user interface 250 when the pressure is below 300-psi.

For a 20-ton hydraulic cylinder, a 10,000-psi peak basis is used. In other words, if a 20-ton cylinder is being used, the hydraulic line is at 10,000-psi and 20 total tons of force are being delivered. In embodiments, a linear pressure response is followed from 0-100%, such that for every 1,000 internal psi within the hydraulic line while using a 20-ton cylinder, 2-tons (i.e., 4,000-lbs) of force is delivered.

System 100 comprises a "Total Pressure" mode that displays the total internal pressure detected by pressure sensor 132 in the hydraulic cylinder. The total pressure is a "raw" pressure being delivered to the press. System 100 also comprises a "Platen Pressure" mode that uses a bag size, entered by the user via the user interface, to adjust the displayed pressure. The platen pressure corresponds to the pressure applied to the surface area of the bag, instead of the total force of the hydraulic cylinder. The pressure values are displayed on user interface 250 in a pressure dialog 255, as depicted in FIG. 3A.

A bag dialog 256 provides a display field and user input buttons on user interface 250 for bag size and weight as depicted in FIG. 3A. Bag size is a user-selectable field of bag dialog 256 displayed in bag dialog 256, which enables the user to enter the bag width and length in inches, for example.

Controller 210 determines the platen pressure by dividing the total force by the bag area (i.e., bag width×bag length). For example, a total pressure of 1000 internal psi on a 20-ton cylinder generates 2-tons or 4,000-lbs of force. For a bag area of 18-in$^2$ (for a 3-in×6-in bag), the platen pressure is 222-psi. In embodiments, if the bag dimensions are not inputted or either dimension is zero, no platen pressure value is displayed on user interface 250. This information is used by the "Pressure source" when system 100 is in "Platen pressure" mode.

Bag weight is a user-selectable field displayed in bag dialog 256, which enables the user to input a weight of the bag. In embodiments, weight information is not used for any calculations by controller 210, but weight information may be stored for tracking with other data.

FIG. 4 shows an exemplary recipes menu 400, which may be displayed on user interface 250. Recipes menu 400 enables the user to access recipes for operation of system 100. The recipes may be entered or modified via recipes menu 400. Two example recipes 401, 402 are shown in FIG. 4; however, system 100 is configured for storing and displaying up to fifteen different recipes, in embodiments. Each recipe may comprise a processing protocol that includes but is not limited to settings for temperature, pressure, bag dimensions, and time. For example, a first (e.g., upper) and second (e.g., lower) zone temperature, a pressure threshold, a bag weight, a bag size (e.g., length and width), and a timer setting. Each recipe may be named (e.g., recipe 401 is named "EX 1"; recipe 402 is named "EX2") and saved for subsequent reuse or editing. Each recipe may be loaded via a "Load Recipe" button 405 associated with a desired recipe name. Clicking "Load recipe" button 405 will direct the user to the home screen, where the recipe values will be loaded and the recipe name will be displayed on the top left of the screen.

System 100 provides two temperature unit options: Fahrenheit (default) and Celsius. Changing units will adjust all units displayed on user interface 250, including preset temperatures and calibration differences.

Timer 253 includes a "countdown" mode (default) and a "count-up" mode. Timer 253 mode does not impact functionality of timer 253 but does change whether the user sees timer 253 count up to the desired value, or count down to zero from the desired value.

Temperature feedback from controller 210 may be calibrated. For example, a second method and a third method for measuring platen temperature, separate and independent of the temperature sensors 112, 122, may be used to calibrate temperature readings.

In embodiments, system 100 provides an automatic shut-off feature that disables heating in the first and second plates 110, 120 after a predetermined amount of time. In some embodiments, the predetermined amount of time is user adjustable via the user interface. For example, the user may select a time of 2, 6, or 12-hours for automatic shutoff. Once automatic shutoff has been performed, system 100 stops heating and the user interface displays a warning message.

In embodiments, a single-zone mode is selectable via user interface 250. The single-zone mode enables selecting only the first zone or the second zone when only one of the first and second plates 110, 120 is connected to controller 210. When the single-zone mode is enabled, an alert will be displayed on user interface 250 only when both plates 110, 120 are disconnected from the controller 210. When the single-zone mode is disabled, an alert will be displayed on user interface 250 when either one of plates 110, 120 is disconnected In embodiments, controller 210 may use two independent software-driven PID controllers to regulate the temperature of each plate. Control gains used for both zones may be the same and may be pre-tuned for the plates 110, 120 coupled with controller 210. System 100 provides two preset PID settings, one for 3×5-in plates and the other for 4×7-in plates. In embodiments, an auto-tuner is provided for automatically selecting the P, I, and D gains for each of the first and second plates 110, 120. To use the auto-tuner, the corresponding plate must be heated to at least 150° Fahrenheit. Once the plate is pre-heated, the PID auto-tuner may be activated and runs automatically. Controller 210 may adjust the temperature of each plate in either direction (e.g., hotter or cooler). Feedback provided to the controller is used to determine the optimal P, I, and D gains. Once finished, a dialog appears on the user interface showing the calculated P, I, and D values for each of the first and second zones. In some embodiments, P, I, and D values are calculated using the Ziegler-Nichols tuning method. Following use of the PID auto-tuner, P, I, and D gains may be edited manually via a "PID Settings" dialog.

For convenience, an orientation of the display on user interface 250 may be changed. For example, a "Flip Screen Orientation" button may be displayed (e.g., in settings), and touching the button causes the display to be rotated.

In embodiments, system 100 includes a Bluetooth Low-Energy (BLE) module for easy communication with other Bluetooth enabled devices (e.g., smartphone, tablet, computer), which may be used to provide software updates, for example.

An error may be displayed on user interface 250 for over-temperature. For example, if one of the plates measures a temperature that exceeds a maximum allowable temperature (e.g., 350° Fahrenheit), an error is displayed on the user interface and power to both heating zones is ceased until the temperature drops below the maximum allowable temperature.

An automatic shutoff timer stops heating after a user-selectable amount of time has elapsed. The amount of time may be selected/edited via a settings page of user interface 250.

Figure 5B:
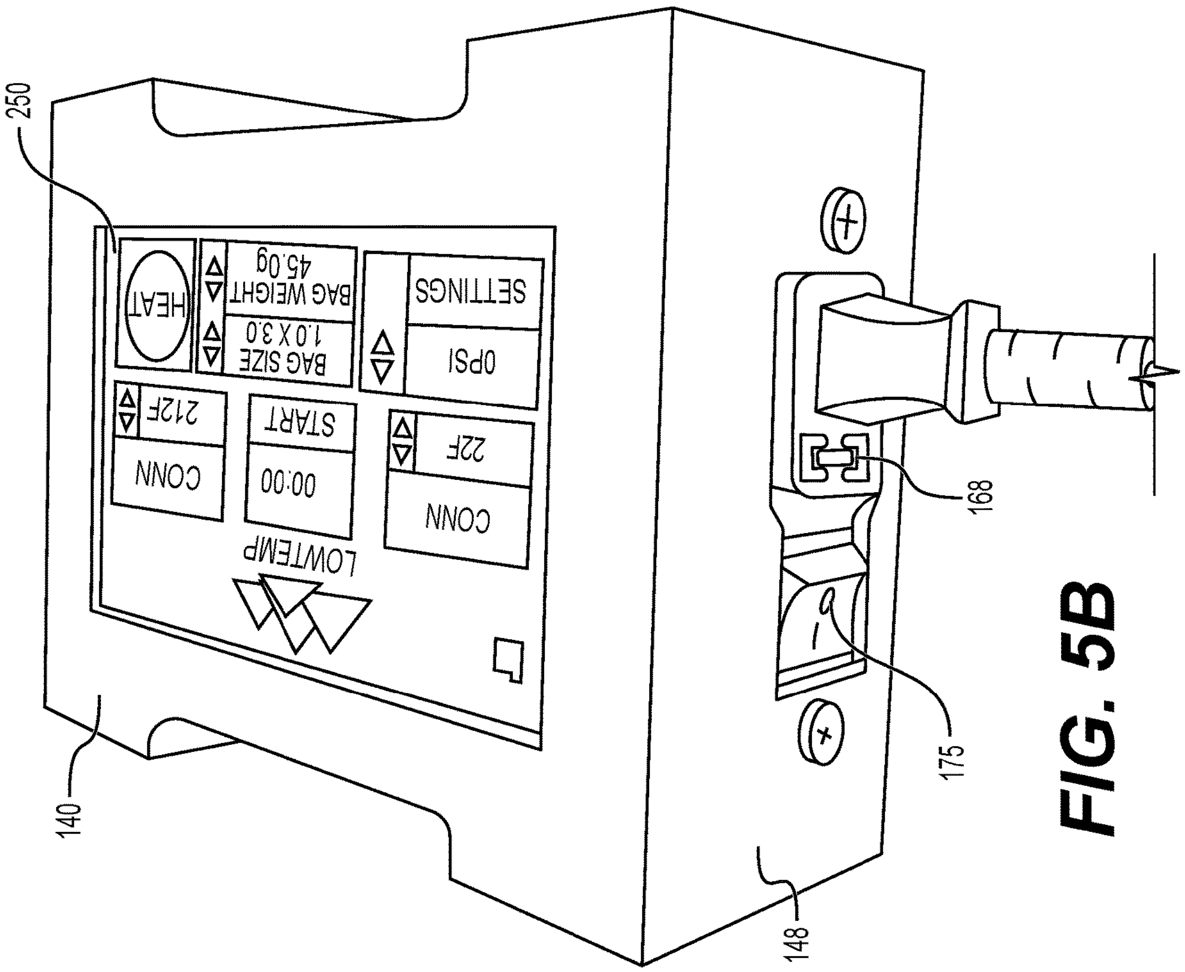
FIG. 5B shows a perspective view of the top enclosure showing a power switch and an AC electrical plug receptacle, in an embodiment.
Figure 5A:
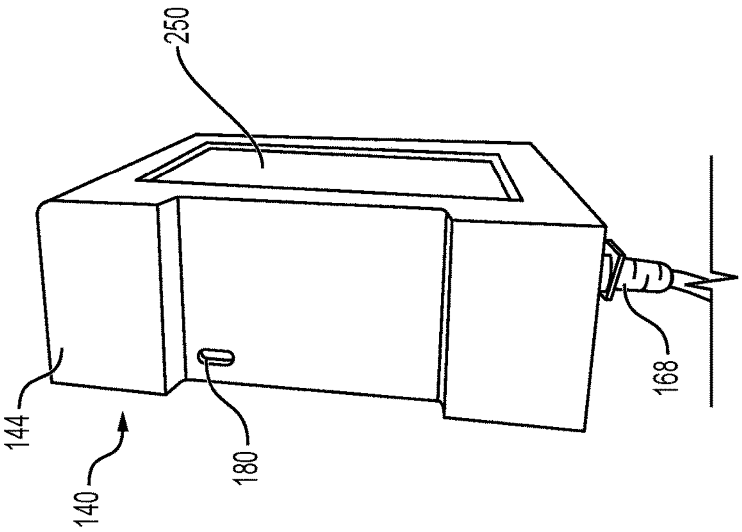
FIG. 5A shows a front view of the top enclosure with a USB-C port, in an embodiment.

FIG. 5A shows a view of front side 144 of top enclosure 140. In embodiments, front side 144 includes a USB-C port 180 for rapid charging of system 100.

FIG. 5B shows a perspective view of left side 148 of top enclosure 140. In embodiments, left side 148 includes a power switch 175 and an AC electrical plug receptacle 168.

In embodiments, controller 210 is configured for operation with a botanical washer tub and chiller tank used for making resin solutions, such as that described in U.S. patent application Ser. No. 17/498,750 entitled System And Method For Making Resin Solutions, and filed on Oct. 12, 2021, the disclosure of which is herein incorporated by reference in its entirety. Controller 210 may be configured to operate as the controller described in the above mentioned disclosure; for example, user interface 250 may be used to input a desired temperature of the washer tub; the wiring connection ports 182, 184, 186 may be used to receive data signals from sensors, such as receiving temperature information via a temperature sensor disposed along an interior surface of the washer tub; inputs and feedback to/from a motor driver may also be provided via controller 210 for controlling the motor of an impeller in the washer tub. Additionally, controller 210 may be temporarily mounted on a stand adjacent the washer tub for facile use and viewing by a user, without departing from the scope hereof.

In certain embodiments, controller 210 is configured for operation with a similar botanical washer tub to that described in the above incorporated by reference U.S. patent application Ser. No. 17/498,750. For example, the volume many be reduced from about 75 gallons to about 30 gallons; the motor may be a 48-VDC motor under control of controller 210; the washer tub may comprise a single wall construction (rather than a double-walled construction with closed-cell foam insulation); and, the washer tub may be a stand-alone device intended for use on a tabletop or countertop (rather than having a built-in cart with casters).

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A heat press dual-zone temperature control system, comprising:

a first plate comprising an internal heating element and a first temperature sensor;

a second plate comprising an internal heating element and a second temperature sensor, wherein the first plate is arranged adjacent and parallel with the second plate;

a controller configured to provide temperature control, comprising:

controlling a temperature of the first plate to a first setpoint based on information from the first temperature sensor; and independently controlling a temperature of the second plate to a second setpoint based on information from the second temperature sensor; and a user interface communicatively coupled with the controller, the user interface comprising:

a first zone configured to receive user input for the first plate and to display information about the first plate; and a second zone configured to receive user input for the second plate and to display information about the second plate.

2. The system of claim 1 comprising a pressure sensor operatively coupling the controller with a cylinder of a hydraulic press for determining a pressure of the hydraulic press, wherein the hydraulic press is configured to press the first plate towards the second plate for squeezing a material therebetween.

3. The system of claim 2, wherein the controller is configured to determine pressure information based on a signal from the pressure sensor and the user interface is configured to display the pressure information.

4. The system of claim 1, wherein the first zone is configured to receive a first temperature input for the first plate and the second zone is configured to receive a second temperature input for the second plate.

5. The system of claim 4, wherein the first zone is configured to display a first setpoint temperature for the first plate based on the first temperature input, and the second zone is configured to display a second setpoint temperature for the second plate based on the second temperature input.

6. The system of claim 4, wherein the first zone is configured to display an actual calibrated first temperature for the first plate based on a signal received via the controller from the first temperature sensor, and the second zone is configured to display an actual calibrated second temperature for the second plate based on a signal received via the controller from the second temperature sensor.

7. The system of claim 1, wherein the controller is configured to monitor for faults and to stop heating the first and second plates when a fault is detected.

8. The system of claim 7, comprising a hardware watchdog configured to automatically power off the heating elements when the fault is detected.

9. The system of claim 1 comprising a timer displayed on the user interface, wherein the timer is selectable for starting, stopping, and counting up or down.

10. The system of claim 2 wherein the controller is configured to automatically start and stop heating based on pressure values as determined via the controller from the pressure sensor.

11. The system of claim 1 wherein the user interface comprises a bag dialog configured for displaying a bag size and a bag weight for a bag containing material to be pressed between the first and second plates, wherein the bag dialog is selectable for inputting the bag size and the bag weight.

12. The system of claim 3 wherein the pressure information displayed is based on a bag size of a bag containing material to be pressed between the first and second plates.

13. The system of claim 1 wherein the user interface comprises a recipes menu configured to display processing protocols and to receive user inputs for modifying the processing protocols.

14. The system of claim 1, wherein the first plate and the second plate each comprise a thermoelectric cooler configured to heat or cool an inner surface of the first plate and the second plate respectively, and the controller is configured to control temperature of the first plate and the second plate by heating or actively cooling via the thermoelectric cooler.

15. A method of operating a dual-zone temperature controller for a heat press, comprising:

selecting, via a user interface, a first desired temperature for a first plate having an internal heating element and a first temperature sensor;

selecting, via the user interface, a second desired temperature for a second plate having an internal heating element and a second temperature sensor, wherein the first plate is arranged adjacent and parallel with the second plate;

initiating heating of the first plate and the second plate via the user interface;

controlling a temperature of the first plate to the first desired temperature via a controller based on information received from the first temperature sensor;

independently controlling the temperature of the second plate to the second desired temperature via the controller based on information received from the second temperature sensor;

displaying the first desired temperature and an actual temperature of the first plate on the user interface; and displaying the second desired temperature and an actual temperature of the second plate on the user interface.

16. The method of claim 15 comprising determining a pressure of a hydraulic press via a pressure sensor operatively coupling the controller with a cylinder of the hydraulic press, wherein the hydraulic press is configured to press the first plate towards the second plate for squeezing a material therebetween.

17. The method of claim 15 comprising monitoring for faults via the controller and stopping heating of the first plate and the second plate when a fault is detected.

18. The method of claim 16 comprising automatically starting and stopping heating of the first plate and the second plate based on pressure values as determined via the controller from the pressure sensor.

19. The method of claim 15 comprising providing a bag dialog on the user interface and receiving a bag size from a user via the bag dialog.

20. The method of claim 16 comprising determining a pressure applied to a bag of material via the first and second plates, wherein the controller calculates the pressure based on an area of the bag combined with pressure information from the pressure sensor.

* * * * *